April 14, 1964  C. W. DOERING  3,128,830
DRAFT SENSING TRACTOR IMPLEMENT HITCH
Filed May 2, 1960  4 Sheets-Sheet 2
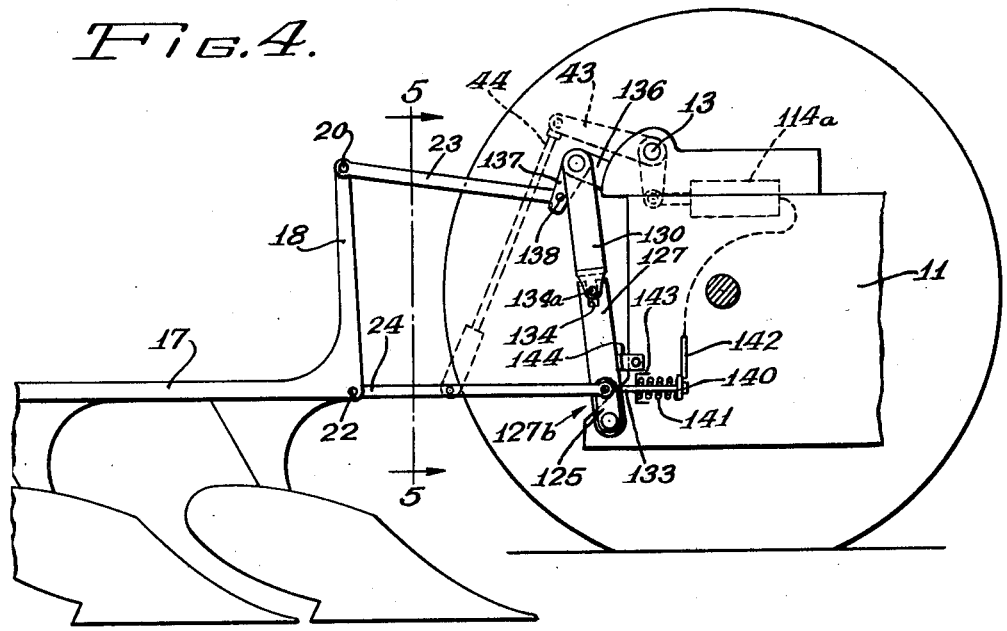
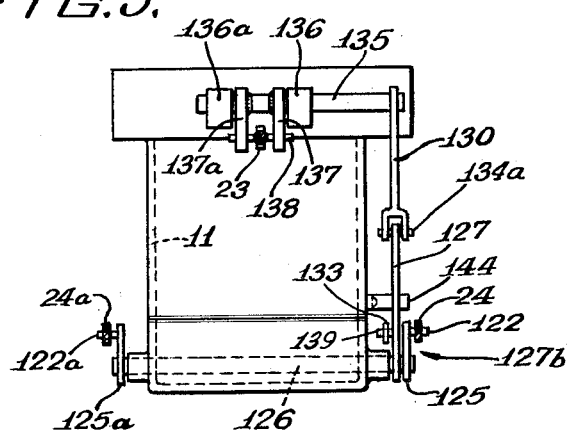
Inventor:
Charles W. Doering
Atty.

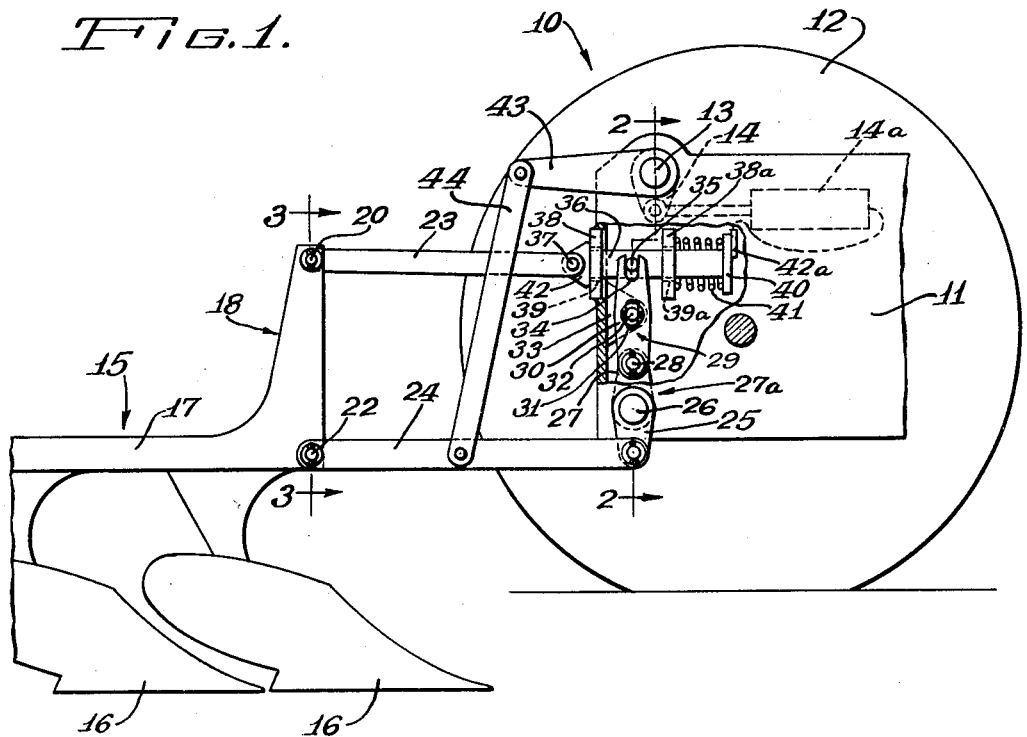

April 14, 1964        C. W. DOERING        3,128,830

DRAFT SENSING TRACTOR IMPLEMENT HITCH

Filed May 2, 1960        4 Sheets-Sheet 3

Inventor:
Charles W. Doering
Paul O. Pippel
Atty.

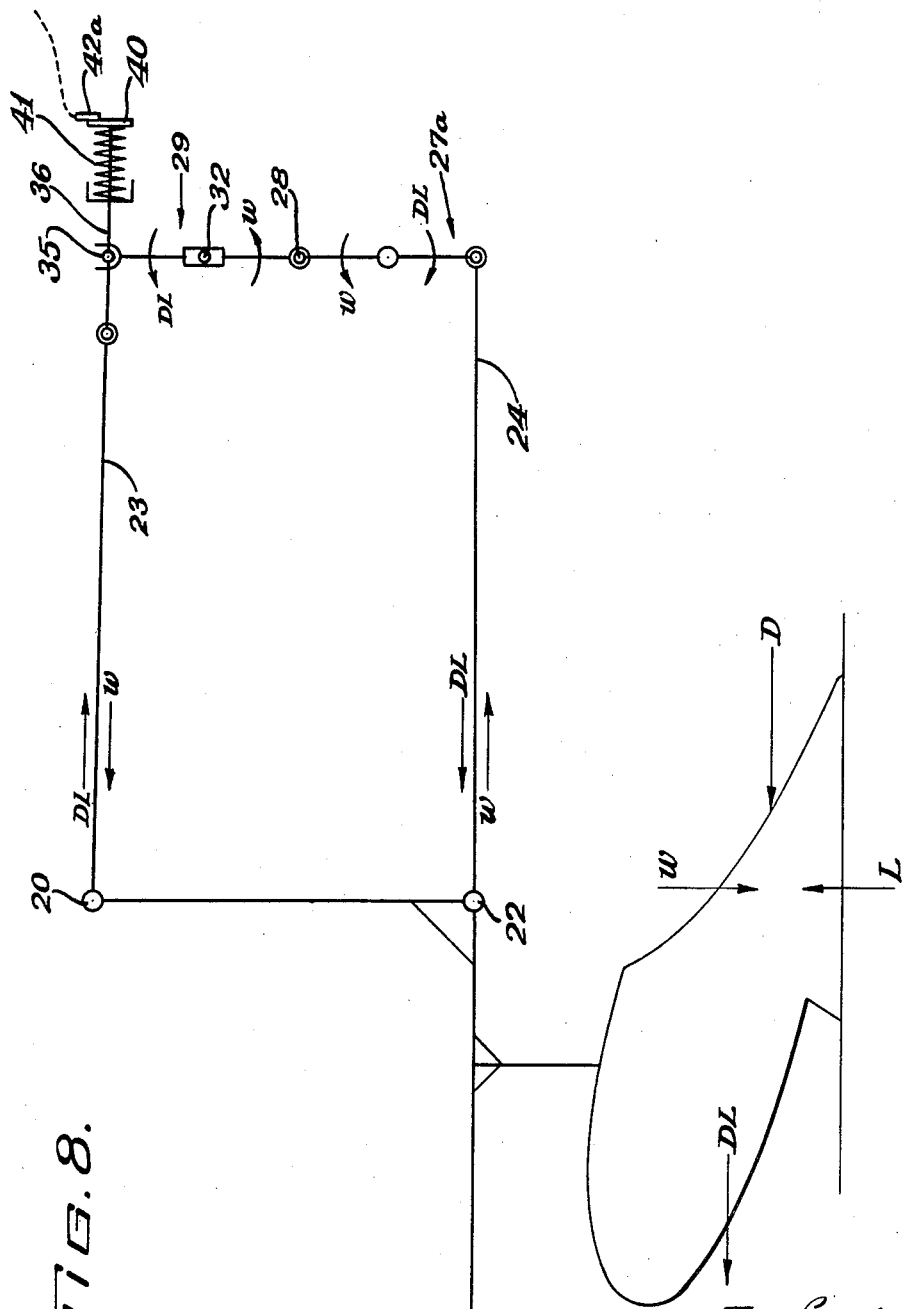

United States Patent Office

3,128,830
Patented Apr. 14, 1964

3,128,830
DRAFT SENSING TRACTOR IMPLEMENT HITCH
Charles W. Doering, Westchester, Ill., assignor to International Harvester Company, Chicago, Ill., a corporation of New Jersey
Filed May 2, 1960, Ser. No. 26,055
8 Claims. (Cl. 172—7)

This invention relates to hitch linkage mechanisms as they are employed for attaching or coupling vehicle-borne agricultural implements to a tractor vehicle equipped with an automatically operated power lift device. More particularly however, it is directed to hitch mechanisms of the three-point type, i.e., where the agricultural implement is hitched or coupled to the vehicle at three points, usually by way of one upper and two spaced-apart lower links, and wherein a stress-responsive member associated with one of these linkage members functions to transmit a sensing signal for automatic control operation of the associated power lift assembly.

Hitch mechanisms of the character with which the present invention is concerned have, heretofore, been recognized as being generally conventional, and in such similar prior art hitch linkages, as was well known, the draft loads imposed on the attached or coupled implement were most frequently sensed or translated by a compressive force reaction in the upper link thereof, which reaction, in turn, initiated the degree of control adjustments required of the power lift mechanism according to the draft load being encountered at that particular moment. In others of such prior devices the draft load force reaction was sensed or registered through one of the lower links, instead of the upper link, but otherwise the hitch linkages were quite similar in operation. In either case, when the draft load was light the implement was automatically adjusted, either by lowering the implement and as a result thereof modifying the pitch of the implement in one direction to compensate for such draft change, and vice versa when the draft load increased, or by transferring a portion of the weight thereof to the vehicle.

It has been found however, that in using linkage mechanisms of this character with implements employing a heavy and long overhanging frame structure, such as in the case of a gang plow having three or more bottoms thereon and where the rearmost plow bottom extends outwardly an appreciable distance from the vehicle, the weight of the implement and its frame, by virtue of being displaced such a large distance from the vehicle, can cause a reaction on the draft-responsive member which overrides the reaction thereon caused by the draft load, thus causing a reversed or inverted reaction which tends to indicate a final resultant reaction that is not accurate or properly indicative of the true draft load on the implement. In fact, it was found that in such a situation the differential between the actual draft load reaction and that of the weight load of the implement and its frame was such that the resultant reaction of such forces tended to create a tensional loading force in the upper draft-responsive link member, instead of the compressive loading component ordinarily encountered therein as a result of an increase in the draft force, thereby giving a false sensing signal to the automatic control mechanism, whereupon the power lift assembly, in its effort to fulfill the demands registered thereon from such sensing response, would fail to provide the draft control adjustment necessary at a given moment. This condition is even more noticeable when the implement is of a light-draft type that is supported by a structure having a heavy overhanging frame so that the weight of said structure is displaced some distance from the vehicle.

In order to overcome the foregoing objectionable tendency of such hitch linkages and thereby make it adaptable to all weight combinations of implements and frame structures it was found desirable to endeavor to eliminate the effect of the support of an implement by the ground, or, otherwise stated, to eliminate the effect of implement weight reaction on the draft-responsive member of the linkage and thus assure that the force reacting on said draft-responsive member would be indicative only of the resultant draft load on the implement, and it is believed the invention outlined hereinafter successfully accomplishes such a goal.

A unique and unusual feature of the present invention therefore, is to provide an improved agricultural implement attaching hitch linkage mechanism which, when employed on a tractor vehicle having automatic draft control lift means for raising and lowering said implement, operates to cancel-out or effectively minimize the effect of implement weight displacement resulting from a long overhang of the implement and its frame from the vehicle, and thereby permit the true draft loads imposed on the implement to be registered by way of a draft-responsive device on the draft control lift means associated therewith.

An important object of the invention is to provide a hitch linkage mechanism, adaptable for use with a light-draft type agricultural implement wherein the implement is mounted by a frame that provides an appreciable overhang from the vehicle upon which it is mounted, that is arranged so as to permit cancellation of the reactive effect of the implement weight or of the location of the center of gravity thereof on a sensing member of the linkage, thereby permitting a force reaction properly indicative of the true draft load being imposed upon the implement to be registered on a draft-responsive device actuable by said linkage.

Another important object is to provide an improved hitch linkage mechanism for attaching an agricultural implement to a vehicle and which is operative for registering and transmitting an accurate control signal to a power lift device in response to variations in draft loads on a light-draft implement of the type that provides an appreciable weight mass displacement overhang from the vehicle.

A further important object is to provide an agricultural implement-attaching hitch linkage mechanism which, when employed with a tractor vehicle having automatic draft control lift means for raising and lowering said implement responsive to variations in draft loads thereon, is operative for permitting longitudinal movement of the linkage resulting from variations of said draft loads without tilting the implement about a horizontal axis or a fore and aft direction or otherwise changing the pitch of the implement while describing the path of said longitudinal movements.

Another object is to provide a three-point hitch linkage mechanism having means operatively interconnecting the upper and lower links thereof at points closely proximate the points of attachment of the hitch mechanism to the vehicle and which is operative for effecting a movement in unison and in the same direction of all of said links.

A further object is to provide a three-point hitch linkage mechanism having articulating means operatively interconnecting the upper and lower link members, for effecting movement in unison thereof, of said linkage mechanism at points proximate the ends of said link members disposed furthermost from the implement attached by said linkage to a vehicle.

A still further object is to provide a three-point hitch linkage mechanism having force-transmitting means interconnecting the upper and lower links of said mechanism, which means is operative to cause said upper and lower links to move in unison and in the same direction and generally as a parallel linkage whereby the upper and lower links thereof, upon longitudinal movement of an agricultural implement resulting from variations of the draft loads imposed upon the implement attached by said linkage to a vehicle, move generally parallel to one another without causing any appreciable variation in the spacing between said links during such longitudinal movement.

A yet still further object is to provide an improved three-point hitch linkage that is operative for accurately sensing variations in draft loads imposed upon an attached implement and thereafter providing accurate sensing signals to an associated power lift device which latter device is operative for effecting accurate draft control of the implement in consonance with said draft load variations.

The foregoing and other objects and advantages are obtained by the present invention, various novel features of which will be apparent from the description herein and the accompanying drawings disclosing several embodiments of the invention, and will be more particularly pointed out in the appended claims.

FIG. 1 is a generally schematic side elevational view of a hitch linkage mechanism, according to the present invention, which is mounted on one end of a tractor vehicle and shown employed in association with a plow frame (fragmentarily indicated) borne by the vehicle.

FIG. 2 is a vertical sectional view of the hitch linkage shown in FIG. 1 and taken on line 2—2 thereof.

FIG. 3 is a vertical sectional view of the hitch linkage shown in FIG. 1 and taken on line 3—3 thereof.

FIG. 4 is a view similar to FIG. 1 but showing a modified form of the proposed invention.

FIG. 5 is a vertical sectional view taken generally on line 5—5 of FIG. 4.

FIG. 6 is a side elevational view of another modified form of structure for showing the teachings of the present invention, there being shown therein only limited portions of the associated linkage mechanism, vehicle and implement.

FIG. 7 is a vertical sectional view taken generally on line 7—7 of FIG. 6.

FIG. 8 is a schematic representation of the linkage mechanism of the form of the invention shown in FIGS. 1–3.

Referring now to the drawings, it will be noted there is depicted in FIG. 1 one preferred embodiment of the present invention, but it will be appreciated that this is generally illustrative and should not be considered as limiting since the invention is susceptible of other variations as evidenced, among others, by succeeding figures of the drawings.

As shown in FIG. 1, the invention is employed with a conventional tractor vehicle, shown only fragmentarily and indicated generally by the reference character 10, and having a frame 11 and a pair of rear wheels one of which is illustrated by the numeral 12. A rockshaft 13 is pivotally mounted on a portion of the frame 11 and is adapted for operative connection, by any well known means such as the motion-transmitting mechanism shown at 14, to a power lift assembly shown generally at 14a. Since power lift devices for such purposes are so well known and universally employed on vehicles today it was felt no useful purpose would be served to further illustrate details and to describe the specific operation of any particular such device herein. Suffice it to say that the power lift unit, whatever type it may be, is intended to rotate the rockshaft 13 and thereby raise or lower the attached implement with a reasonable measure of fidelity in consonance with the variations in draft loads imposed upon the implement as is well understood in the art.

Although the proposed invention may be used with practically all types of earth-working agricultural implements, the implement selected for illustration herein is a gang-type of moldboard plow, such as shown generally at 15, having a plurality of bottoms 16 thereon that are carried by a rigid beam-like frame structure 17. The frame 17 which may be generally conventional in construction is fashioned with the vertical mast member 18 resembling an inverted figure T with the stem thereof comprising two parallel and spaced-apart members 19–19a with a centrally positioned single upper pivotal connecting pin 20 therein, while the transverse member of the mast includes a bar 21 providing a pair of laterally spaced lower pivotal mounting pins such as 22, 22a on opposite ends thereof.

The implement frame 17 is connected or coupled to the vehicle frame 11 through a three-point hitch linkage mechanism which includes an upper link 23 having the outer or rearward end thereof pivotally connected to pin 20, and a pair of laterally spaced lower links 24, 24a the outer or rearward ends of each of which are pivotally connected to a respective pin 22, 22a. The forward or inboard ends of said lower links are pivotally mounted on the respective ends of the transversely spaced crank arms 25, 25a which are mounted upon and constrained for rotation with a transverse shaft, such as 26, pivotally carried by the vehicle frame 11 and which is provided with a lever 27 affixed thereto proximate the midpoint thereof thus constituting a bell-crank, indicated generally at 27a, fashioned by the integrally connected crank arms 25, 25a, shaft 26 and lever 27. The opposite end of lever 27 is pivotally connected by a pin such as 28 to one end of a split bail-like rocker or walking beam assembly 29 having spaced-apart arms 30, 30a longitudinally slotted as at 31, 31a and, in turn, pivotally and slidably mounted on a pin such as 32 that projects through said slots and is fixedly anchored by a bracket 33 carried by the frame 11. The opposite or upper end of each of the arms 30, 30a has a slotted opening or recess 34, 34a extending inwardly from the end face of each said arm that is adapted to slidably accommodate in straddle or bail-like fashion a pin, such as 35, affixed to a horizontally positioned actuator draft or stress-responsive member 36, while said actuator is pivotally connected by a pin 37 at one end thereof to the free or inner end of the upper link 23. Support brackets or blocks 38, 38a which are suitably secured to the frame 11 are fashioned with aligned openings 39, 39a therethrough for slidably accommodating the actuator member 36. A collar-like head 40 on the inner end of the draft-responsive actuating member 36 serves as an abutment for one end of a coil spring 41 disposed to envelop a portion of said actuator member while the opposite end of said spring rests and reacts against or abuts the forwardmost bracket 38a. As thus disposed the spring is reactively compressible between the head 40 and the bracket 38a to resist longitudinal rearward movement of the response member 36. An enlarged head 42 on the opposite end of the actuator member 36 is dimensioned to overlap the opening 39 in the rearmost support bracket 38 and thus acts as a stop means to prevent inward movement of said actuator member beyond a predetermined position. An operating linkage, shown in part by the reference character 42a, constitutes the signal transmitting means for interconnecting the stress-responsive member and the power lift means 14a.

The rockshaft 13 has a pair of lift or rocker arms 43, 43a disposed at opposite ends thereof that are constrained for rotation with said shaft and the opposite or free ends of said rocker arms are pivotally connected one each to a respective lift arm 44, 44a that, in turn, is pivotally connected to a respective lower link 24, 24a. Thus when the rockshaft 13 is rotated by way of the mechanism 14 and the power lift means 14a the implement attaching hitch linkage mechanism is correspondingly raised or lowered through the resultant movements of the interconnecting rocker arms 43, 43a and the lift arms 44, 44a, as is well understood.

In order to better understand the operation of the invention an explanation of the relationships of the forces encountered by the hitch linkage mechanism and the manner in which it is believed these forces react may be in order. Assume first that since the vehicle is at rest the implement, such as the plow illustrated, is not being subjected to any draft forces whereupon the hitch linkage components may be positioned substantially as shown in FIG. 1. In this case the draft force, indicated by the letter D (FIG. 8), acting on the plow as well as the vertical soil reaction force, indicated by the letter L, acting thereon will be zero, while the force, indicated by the letter W, resulting from the weight of the plow and its frame acting in a generally vertical direction will cause the implement frame to tend to rotate counterclockwise about the pivotal pins 22, 22a. Incident to this rotational tendency a compressive force is set up in the lower links 24, 24a, and, because of the tendency of the plow and its frame to rotate about the pins 22, 22a, the upper link 23 will have a force in tension created therein since said link is resisted against movement at its inboard end by the spring 41. With the upper link in tension there is a reactive tendency acting through the pin 35 tending to rotate the rocking assembly 29 in a counterclockwise direction about its pivot 32 and, through the interconnecting pin 28, causing the interconnected bell-crank 27a to tend to rotate clockwise carrying the shaft 26 and crank arms 25, 25a therewith. However, since the opposite ends of these latter arms are pivotally connected each to a lower link 24, 24a, such rotational tendency will tend to put a compressive force in said lower links that will act to oppose the compressive force therein resulting from the weight reaction on pins 22, 22a. Now if moment arms as represented by the lengths of the crank arms 25, 25a and lever 27 are equal to the moment arms represented by the portions of rocker assembly 29 between pins 35 and 32 and pins 32 and 28, respectively, these two forces will balance out thus putting the linkage in equilibrium and there will be no actual movement of the implement attaching linkage. Since the upper link 23 cannot move except in concert with the lower links 24, 24a there will be no movement of the stress-responsive member 36, associated in this instance with the upper link, and hence no adjustment or correction of the automatic control of the power lift assembly will be forthcoming because the result of the weight reaction thereon will be nil.

Assume next that the vehicle is in motion and the implement is being subjected to draft loading in the earth. In this case the vertical soil reaction force (L) and the draft load force (D) will ordinarily cause a resultant reaction in the upper and lower links that may be indicated by the letters DL. The direction of this resultant reaction because of well known design characteristics of the implement will be generally parallel to the hitch linkage mechanism and thus will tend to place the lower links 24, 24a in tension while the upper link 23 is placed in compression. Since these links are interconnected through the rocker assembly 29 and the associated bell-crank 27a there would ordinarily be a tendency through such interconnection to balance out these forces and thus stabilize the linkage. However, in the proposed linkage because of the positions of links 23 and 24 relative to each other and to the point at which the resultant reaction force acts on bottoms 16, moment arm relationships are established such that the force of tension in the lower links will be substantially double that of the compression force in the upper links and which tension force, when transmitted by way of the bell-crank 27a and the walking beam or rocker assembly 29 to the upper link 23, as indicated by the respective DL vectors associated with these elements on FIG. 8, easily overrides the compressive reaction in said upper link. This differential in forces thereby becomes effective to reverse the direction of compressive force in the upper link and this thereupon causes both the upper and lower links to move longitudinally rearwardly responsive to a draft load increase sufficient to cause the actuator member 36 to compress the spring 41, whereupon the interconnecting signal transmitting means 42a transmits a demand signal to the power lift means 14a which then reacts in fulfillment of such signal to rotate the rockshaft 13 and adjust the implement according to said draft load requirement. As a result the implement is adjusted according to the draft load imposed thereon at a given moment regardless of any weight reaction set up in the linkage by virtue of the weight of the implement and its frame. Hence, any draft load imposed on the implement regardless of how light or heavy such draft loading may be will be registered through the draft-responsive mechanism so as to provide an accurate signal for motivating the associated power lift means.

In FIGS. 4 and 5 there is illustrated a modified form of the present invention wherein the stress-responsive member registers draft reaction by way of the lower link instead of by way of the upper link as previously described. In this instance the plow frame 17 is also carried by lower pivot pins 22, 22a and an upper pin 20 on the three-point hitch linkage which includes a pair of spaced lower links 24, 24a and a single upper link 23 that, in turn, are coupled to the vehicle. The inboard ends of the lower links are pivotally connected, respectively, by pins 122, 122a to crank arms 125, 125a which, in turn, are mounted on and constrained for rotation with a shaft 126 pivotally carried by the vehicle frame 11. Mounted on the shaft 126 and constrained for rotation therewith is a lever 127 so that as arranged the arms 125, 125a, shaft 126 and lever 127, in effect, provide a bell-crank device indicated generally by the reference character 127b. The lever 127 has a slotted recess 134 extending inwardly from the end face of the free end thereof which is fashioned to slidably accommodate a pin 134a fixedly positioned or anchored in a bifurcated free end portion of a link member 130. The opposite end of link member 130 is mounted on a shaft 135 for rotation therewith and said shaft is pivotally carried by brackets, such as 136, 136a, mounted on the vehicle frame 11. A pair of spaced-apart crank arms 137, 137a mounted for rotation with the shaft 135 have a pin 138 anchored in the free ends thereof for pivotally supporting the free end of the upper link member 23. A pivot pin 139 fixed to the lever 127 pivotally receives one end of an actuator member 133 the opposite end of which has secured thereon a collar-like head 140. Positioned around the actuator 133 and between the collar 140 and a bracket-like abutment 143 carried by the frame 11 is a spring 141. A signal transmitting means, shown in part by the reference character 142, is constrained for movement with the spring 141 and interconnects said spring with the associated power lift control means 114a so that sensing signals registered by said spring may be transmitted to said lift means. A stop member such as the bracket-like abutment 144 is mounted on the frame 11 and serves to limit forward movement of the lever 127. As before, the rockshaft 13 is connected by rocker arms 43, 43a and lift arms 44, 44a (only one of each of which is shown) with the respective lower links 24, 24a. In this modification when the levers 127 and 130 are of equal length and the crank arms 125, 125a are of the same length as the arms 137, 137a the weight reaction forces will be balanced and the linkage put in equilibrium so that only true draft forces will register on the response member 133.

In FIG. 6 there is illustrated a further modification of the means for interconnecting the inboard ends of the three-point hitch linkage in order to meet the teachings of the present invention. In this view, which is generally fragmentary, neither the attached implement nor the completed hitch structure has been shown since these components are the same as heretofore described in connection with the structures depicted in FIGS. 1–5.

The upper link 23 of the three-point hitch linkage mechanism has the inboard or forward end thereof connected to a transverse member 235 that, in turn, is pivotally connected as at 237, 237a to one leg of the upper bell-cranks, indicated generally by the reference character 236, 236a which are pivotally mounted at 238, 238a to brackets 239, 239a, in turn, carried by the vehicle frame 11. Each of the lower links 24, 24a is pivotally connected, as shown for instance at 225, 225a, to a respective lower bell-crank 226, 226a that is pivotally mounted as at 227, 227a by brackets 228, 228a, in turn, carried by the vehicle frame 11. An interconnection between the lower bell-cranks 226, 226a and the upper bell-cranks 236, 236a includes a transverse shaft member 229b whose opposite ends are carried at 229, 229a by the respective bell-cranks 226, 226a and the vertical link members 230, 230a thereof that have the upper ends thereof pivotally connected as at 231, 231a to the other leg of the upper bell-cranks 236, 236a. An extension 224 of the lower link 24 has a collar-like head 240 thereon which abuts a spring 241 disposed between said head and an abutment 243 affixed to the vehicle frame 11. A signal transmitting means, shown in part by the reference character 242, is adapted for transmitting sensing signals from the responsive member 224 to the power lift means as is well understood. An abutment such as 244 affixed to the frame 11 provides a stop for limiting forward movement of the bell-crank 226. In this structure when the distance of the lower bell-crank arm between pivot points 225 and 227 equals that of the comparable upper arm between points 237 and 238, and the lower arm between points 227 and 229 equals the upper arm between 231 and 238 the weight reaction forces will be balanced and the linkage put in equilibrium so that only true draft forces will register on response member 224.

While only a limited number of forms of the invention have been shown, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. A hitch linkage mechanism for coupling an earth-working implement to a vehicle, comprising: an upper link, and a pair of aligned and laterally spaced lower links all of which links are pivotally connected at one end of the links to an earth-working implement; first bell-crank means pivotally mounted on the vehicle and having one arm thereof pivotally connected to an opposite end of said upper link; second bell-crank means pivotally mounted on the vehicle and having a pair of laterally spaced arms thereof pivotally connected one each to a respective opposite end of said lower links; each of said bell-cranks having an additional arm extending toward one another; means pivotally and interlockingly connecting the free ends of each of said additional arms to one another so that movement of either one of said additional arms effects movement of the other of said additional arms in unison therewith; stop means cooperative between the vehicle and one of said bell-cranks for limiting rotative movement of said bell-crank in one direction relative to the vehicle; and spring means supported by the vehicle and connected to one of the arms of one of said bell-cranks and disposed upon being compressed for normally yieldably resisting rotative movement of said connected bell-crank in one direction relative to the vehicle.

2. A hitch linkage mechanism for coupling an earth-working implement to a vehicle, comprising: an upper link, and a pair of aligned and laterally spaced lower links all of which are pivotally connected at one end of the links to an earth-working implement; first bell-crank means pivotally mounted on the vehicle and having one arm thereof pivotally connected to an opposite end of said upper link; second bell-crank means pivotally mounted on the vehicle and having a pair of laterally spaced arms thereof pivotally connected one each to a respective opposite end of said lower links; each of said bell-crank means having an additional arm extending toward one another; means pivotally and interlockingly connecting the free ends of each of said additional arms to one another so that movement of either one of said additional arms effects movement of the other of said additional arms in unison therewith; said first bell-crank being fabricated so that the length of the said one arm thereof as measured between the axis of the pivotal mounting of the first bell-crank and the axis of the pivotal connection of the one arm thereof to the upper link is equal to the length of each arm of the said pair of laterally spaced arms of said second bell-crank means as measured between the axis of the pivotal mounting of said second bell-crank means and the axis of the pivotal connections of the spaced arms thereof with the respective lower links; said additional arms being fashioned so that the lengths thereof as measured between the respective pivotal axes of said bell-cranks and the axis of said pivotally interlocking connection are substantially equal when said additional arms are in longitudinal alignment with one another; and spring means supported by the vehicle and connected to one of the arms of one of said bell-cranks and disposed upon being compressed for normally yieldably resisting rotative movement of the connected bell-crank in one direction relative to the vehicle.

3. The structure defined in claim 2 but further characterized by having stop means cooperative between the vehicle and one of said bell-cranks for limiting rotative movement of said latter bell-crank in one direction relative to the vehicle.

4. A hitch linkage mechanism for coupling an earth-working implement to a vehicle, comprising: first, second and third links spaced from one another with the first thereof spaced vertically from said second and third links which latter two are transversely aligned and all of said links being pivotally connected on fixed centers at outer ends thereof to the implement; a plurality of separate means, one of which connects the inner end of said first link and another of which connects the inner ends of second and third links to the vehicle and operative to permit longitudinal movement of said links relative to the vehicle and substantially parallel to one another; additional means interconnecting said plurality of separate means and responsive to draft loading imposed on said implement for effecting movement of all said links in the same direction and in unison; said additional means being further arranged and proportionally dimensioned between said plurality of separate means so that the amount of movement is substantially equal for all said links; and spring means supported by the vehicle and connected to said additional interconnecting means and disposed upon being compressed for normally yieldably resisting longitudinal movement of said links relative to the vehicle responsive to draft loading on the implement.

5. A hitch linkage mechanism for coupling an earth-working implement to a vehicle, comprising: an upper link and a pair of aligned lower links all of which are pivotally connected at one end thereof to an earth-working implement; first means movably supporting opposite ends of said lower links on the vehicle; second means movably supporting an opposite end of said upper link on the vehicle; third means interconnecting said first and second means and responsive to draft forces imposed on said implement for effecting longitudinal movement of said upper and lower links substantially parallel to one another and in the same direction and in unison; said third means being arranged and proportionally dimensioned between said first and second means to assure that the amount of rearward longitudinal movement is substantially equal for all said upper and lower links; and resilient means supported by the vehicle and connected to said interconnecting third means and disposed upon being compressed for normally yieldably opposing rearward longitudinal movement of said link members relative to said vehicle responsive to draft forces on the implement.

6. In a hitch linkage mechanism for coupling an agricultural implement to a vehicle having a power lift device therein operative responsive to variations in draft loads imposed on said implement for adjusting the implement according to the draft load demands thereon, the combination, comprising: a hitch linkage mechanism including a plurality of spaced-apart and fore and aft extending link members each of which is pivotally connected at one end thereof to said implement and at the opposite ends thereof being supportably connected to said vehicle, and being movable longitudinally in substantially parallel relationship to one another responsive to variations in draft loads on said implement; force transmitting means interlockingly connecting said opposite ends of said plurality of link members and responsive to variations in draft loads on said implement for effecting the movement in equal amounts of all said link members in the same direction and in unison when said link members move longitudinally; draft-responsive means operatively connected between said force transmitting means and said power lift device and operative responsive to movement of said latter means for controlling said power lift device; and spring means supported on said vehicle and connected to said draft-responsive means and disposed upon being compressed for yieldably normally resisting movement of said draft-responsive means.

7. In a hitch linkage mechanism for coupling an earth-working implement to a vehicle, the combination, comprising: a single link member; a pair of laterally spaced and aligned link members vertically spaced below said single link member; said link members being disposed to provide forward and rearward ends therefor and having the rearward ends thereof pivotally connected to said earth-working implement for movement therewith; a plurality of separate means, one of which pivotally connects the forward end of said single link member and another of which pivotally connects the forward ends of said pair of link members to the vehicle; equilibrium stabilizing means inter-connecting the forward ends of said link members and responsive to the reactive forces in said link members for preventing longitudinal movement of said link members relative to the vehicle resulting from the weight only imposed thereon by said implement and for effecting longitudinal movement of all said link members in the same direction and in unison when said link members move responsive to variations in draft loads on said implement; said equilibrium stabilizing means being arranged and proportionally dimensioned between said link members so that the amount of longitudinal movement is substantially equal for all said link members.

8. The structure recited in claim 7 wherein said equilibrium stabilizing means includes force-transmitting means interlockingly interconnecting the said separate connecting means for balancing out force reactions in said link members resulting from the weight only of the implement to prevent longitudinal movement of said link members relative to the vehicle.

References Cited in the file of this patent
UNITED STATES PATENTS

| | | |
|---|---|---|
| 2,480,387 | Smith | Aug. 30, 1949 |
| 2,701,508 | Richey | Feb. 8, 1955 |
| 2,816,497 | Smith | Dec. 17, 1957 |
| 2,844,083 | Du Shane | July 22, 1958 |